United States Patent [19] … [11] Patent Number: 5,987,801
Anderson … [45] Date of Patent: Nov. 23, 1999

[54] FISHING ROD HOLDER TIP-UP

[76] Inventor: Arne Ray Anderson, 412 $7_{th}$ St., Watertown, S. Dak. 57201

[21] Appl. No.: 09/032,173

[22] Filed: Feb. 27, 1998

[51] Int. Cl.[6] .................................................. A01K 97/12
[52] U.S. Cl. .................................................. 43/17
[58] Field of Search ............................ 43/15–17, 21.2

[56] References Cited

U.S. PATENT DOCUMENTS

| | | | |
|---|---|---|---|
| 2,650,052 | 8/1953 | Bintz | 43/21.2 |
| 2,684,509 | 7/1954 | Couturier | 43/17 |
| 2,773,326 | 12/1956 | Calvert | 43/16 |
| 2,828,096 | 3/1958 | Beri | 43/21.2 |
| 3,060,616 | 10/1962 | Woodley | 43/17 |
| 3,115,722 | 12/1963 | Mann | 43/21.2 |
| 3,824,730 | 7/1974 | Johnson | 43/17 |
| 4,043,070 | 8/1977 | Lamothe | 43/21.2 |
| 4,159,816 | 7/1979 | Miyamae | 43/21.2 |
| 4,161,839 | 7/1979 | Ward | 43/17 |
| 4,373,287 | 2/1983 | Grahl | 43/17 |
| 4,463,511 | 8/1984 | Copfer | 43/21.2 |
| 4,522,572 | 6/1985 | Hahn | 43/16 |
| 4,523,403 | 6/1985 | Ivy et al. | 43/17 |
| 4,805,336 | 2/1989 | Heyerman | 43/17 |
| 4,837,965 | 6/1989 | True | 43/17 |
| 5,050,333 | 9/1991 | Debreczeni | 43/17 |
| 5,228,227 | 7/1993 | Hodgson, Sr. | 43/15 |
| 5,349,775 | 9/1994 | Mondares | 43/21.2 |
| 5,873,191 | 2/1999 | Bova et al. | 43/15 |
| 5,890,312 | 4/1999 | Ball | 43/16 |

Primary Examiner—Michael J. Carone
Assistant Examiner—Darren Ark
Attorney, Agent, or Firm—Curtis Harr

[57] ABSTRACT

A folding frame apparatus is provided that contains a removable and pivoting rod clamp employed to hold a ice fishing jig rod in the desired position, and is designed in a manner that it can be used with almost all of the ice fishing jig rods on the market today. The frame of the present invention is constructed in a manner that all joints are pivotal by the use of a wing nut assembly, which allows the frame to be opened or closed as desired by the user. The present invention is also equipped with a signal flag assembly which, when a fish takes the bait, causes the flag to move to an upright position and alerts the fisherman to the presence of a fish.

11 Claims, 3 Drawing Sheets

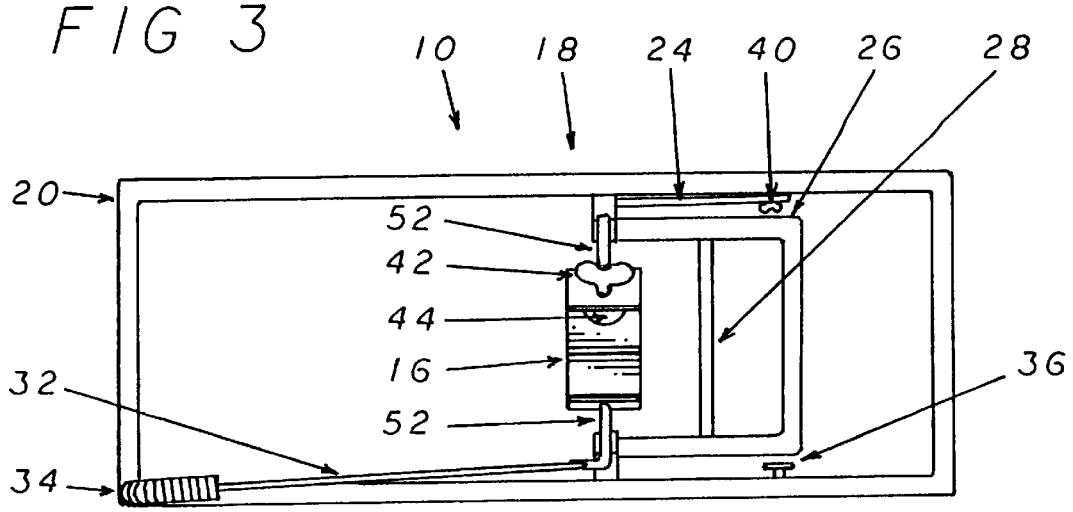
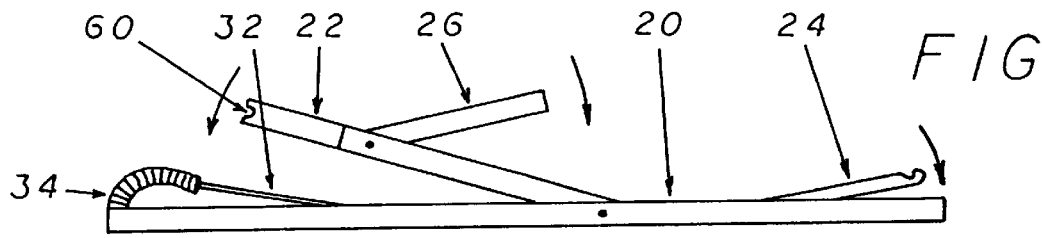
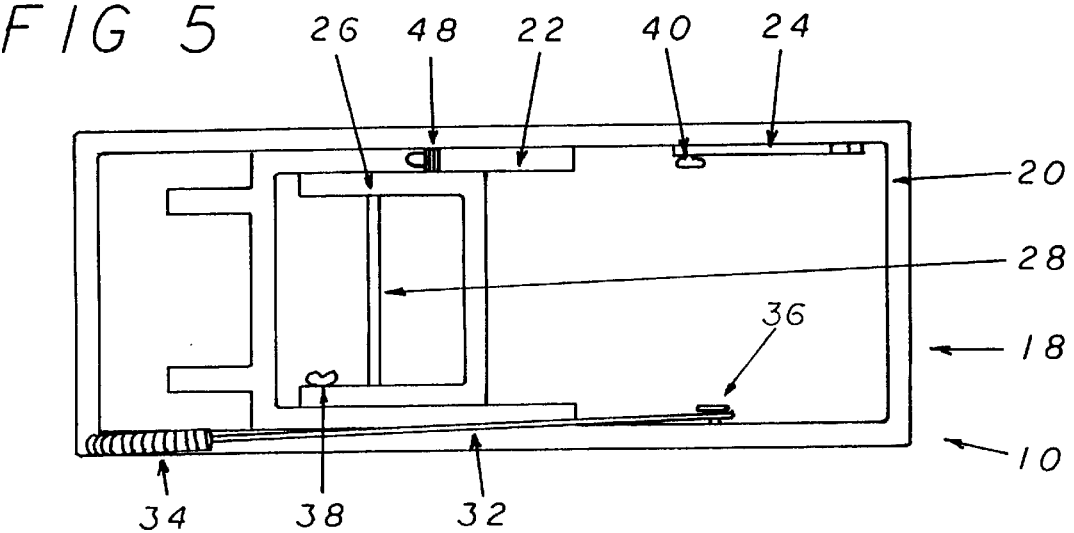

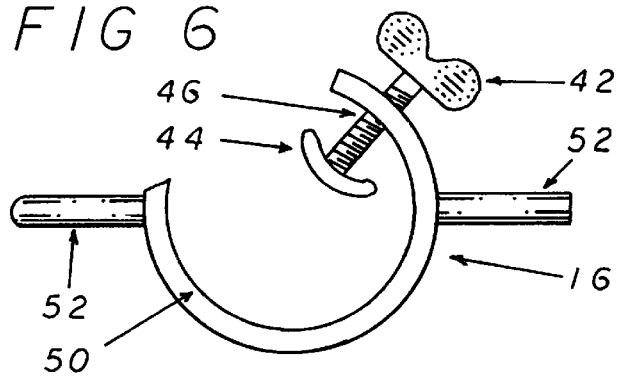
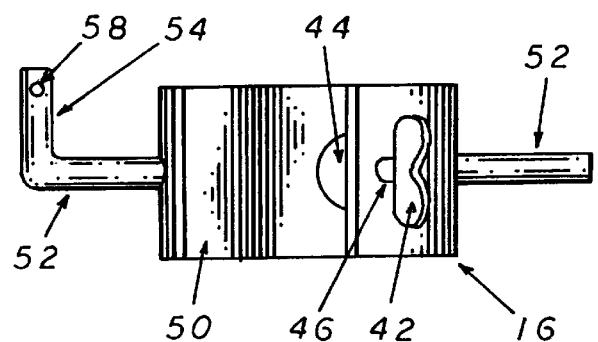
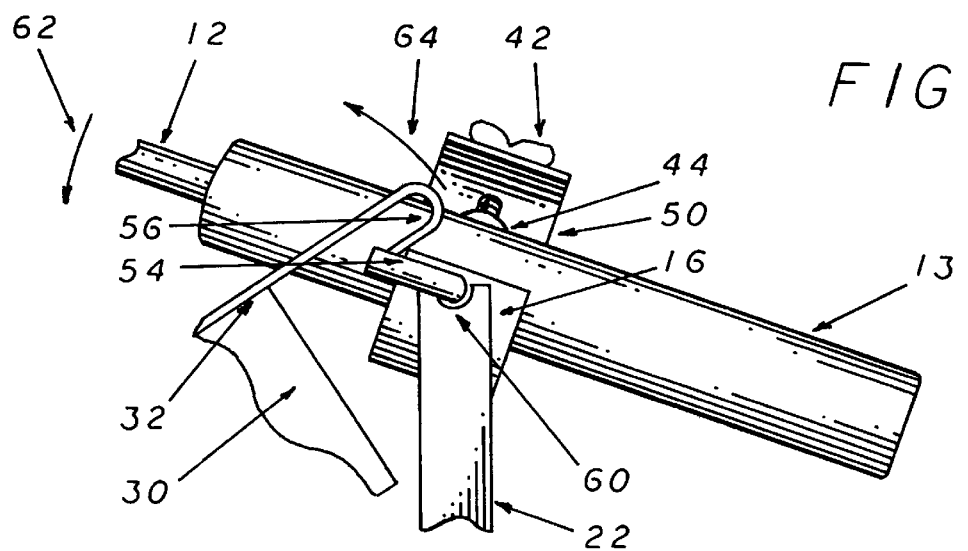

FISHING ROD HOLDER TIP-UP

BACKGROUND OF THE INVENTION

The present invention relates to an improvement in an ice fishing tip-up. More specifically, a device for holding a commonly used ice fishing jigging rod in a collapsible bracket designed in a tip-up arrangement.

Jigging rods are commonly used in ice fishing when a sportsman fishes directly over an ice fishing hole, holding a rod while jigging a lure up and down through the hole in order to attract fish. An ice fisherman may have several jigging rods with him on a fishing trip supplied with varying line sizes, lures and rod and reel strengths. These rods may be used to varying degrees, depending on the type of fish being caught or desired.

Commonly, when ice fishing, an ice fisherman will fish out of a house or sheltered structure using a jigging rod in order to catch fish. Fisherman will also, at the same time, place holes drilled in the ice some distance away from the house, and supply these holes with what is known as tip-ups or unattended ice fishing devices. These devices will have some type of indicator that will signal the ice fisherman in the house when there has been a bite on that line. The reason for drilling holes far away from the house is so that an ice fisherman may fish for larger game fish away from the house, while jigging for smaller game fish within the house. This will result in larger game fish being away from the house, preventing them from scaring smaller game fish away. It may also be done to simply cover more area.

One of the problems with commonly used tip-up rods is that the device can be rather cumbersome or large, and not easily carried around by ice fisherman who like to remain rather mobile while fishing. A further problem with tip-up type rods is that they can be rather expensive and thus, it is not convenient to have a tip-up rod that utilizes varying degrees of line strength or setups.

From this, it follows that it would be desirable to supply tip-up apparatuses that can be used with common jigging rods and further hold a jigging rod in a tip-up fashion and thus, unattended with some sort of signaling device. This type of device could take advantage of fisherman's existing jigging rods.

Prior art fishing rigs of this type have existed for some time. U.S. Pat. No. 5,050,333 issued to Debreczeni discloses a fishing rig which uses a jigging type rod attached to a knock down base. The problem with this design is that the base and jigging rod must be designed to match, thus the base cannot be used with any commonly available jigging type rod as a special mounting system must be utilized.

Another such assembly is disclosed in U.S. Pat. No. 4,837,965 issued to True. This patent also utilizes a tip-up base for holding a jigging type rod, however the jig rod must be supplied with the proper attachment points to match the base. Thus, this system cannot be used with any commonly available jigging type rod.

U.S. Pat. No. 3,824,730 issued to Johnson discloses a base section having a rotatable bar through the middle made to match with a jigging rod. Although this patent somewhat solves the problem of connecting to commonly available jigging rods, the apparatus or connection point to the jigging rod limits its use with all jigging rods. Further, the base is not very portable as it is a one piece base which is designed in a non-foldable or non-collapsible structure.

From this discussion, it can be seen that it would be desirable to provide a collapsible tip-up frame that can be used with most commonly available ice fishing jig rods, and further to have the tip-up base supplied with some type of signaling means in order to allow a fisherman to determine when a bite has occurred on a given line.

SUMMARY OF THE INVENTION

It is the primary objective of the present invention to provide a fishing implement that is light in weight, can be easily disassembled and folded into a compact package, and can be quickly put away for transport or long term storage purposes.

It is a further object of the present invention to provide such an implement that provides an accurate method of signaling when a fish has taken the offered bait, thus, enabling the user to set the hook in a timely and effective manner, maximizing his efficiency.

It is a still further objective of the present invention to provide such a means that can be used with readily available ice fishing jigging rods.

These objectives are accomplished by the use of a folding frame apparatus that contains a removable and pivoting rod clamp employed to hold an ice fishing jig rod in the desired position. The frame of the present invention is constructed in a manner such that all joints are pivotal by the use of a wing nut assembly which allows the frame to be opened or closed as desired by the user. Thus, to change between the open or closed position, the user simply loosens the wing nuts, makes the desired changes, and then retightens the wing nuts to hold the base in the desired position. In the open position, the present invention will hold an ice fishing jig in the desired location. In the closed position, it is compact and provides for easy storage and transport.

The present invention is also equipped with a signal flag assembly, which consists of a flag and a rod and spring assembly. During the rod set-up, the flag rod is attached to the pivoting fishing rod clamp in a configuration which loads the spring. When a fish takes the offered bait, the rod moves, causing the fishing rod clamp to move, releasing the signal flag and flag rod. The load on the spring is then released, causing the flag to move to an upright position, alerting the fisherman to the presence of a fish.

The fishing rod clamp of the present invention is designed in a manner so that it can be used with almost all of the ice fishing jig rods on the market today. This is accomplished by use of an adjustable clamp apparatus into which a variety of fishing rods can be placed and held securely. This greatly increases the flexibility of the present invention, as it can be used with a sportsman's present inventory of fishing gear, and does not require the additional expense of specifically designed jigging rods.

For a better understanding of the present invention, reference should be made to the drawings in which there is illustrated and described preferred embodiments of the present invention.

DESCRIPTION OF THE DRAWINGS

FIG. 3 is a top elevation view of the present invention showing the orientation of its major components, when it is set up for use with a typical fishing implement.

FIG. 4 is a side elevation view of the present invention showing the manner in which the frame is folded down, for storage or transport.

FIG. 5 is a top elevation view of the present invention showing the orientation of the frame's major components, when it is folded down for storage or transport.

FIG. 6 is a side elevation view of the rod clamp component of the present invention showing its method of construction, and the orientation of the major components.

FIG. 7 is a top elevation view of the rod clamp component of the present invention showing its method of construction, and the orientation of the major components.

FIG. 8 is a side elevation view of the rod clamp component of the present invention shown, as used in conjunction with a typical fishing rod, and detailing the manner in which the signal flag rod is attached to the rod clamp.

DESCRIPTION OF THE PREFERRED EMBODIMENT

Figure 1:
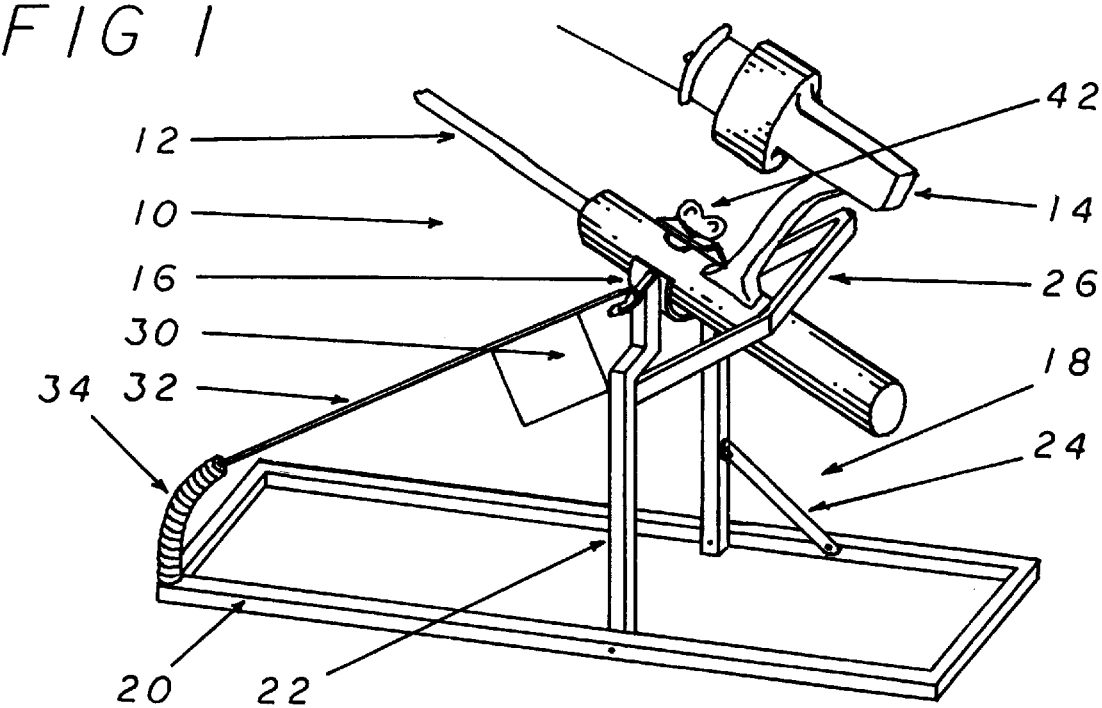
FIG. 1 is a perspective view of the present invention showing the manner in which it is used in conjunction with a typical ice fishing pole, and the way it is set to indicate when a fish has taken the bait.
Figure 2:
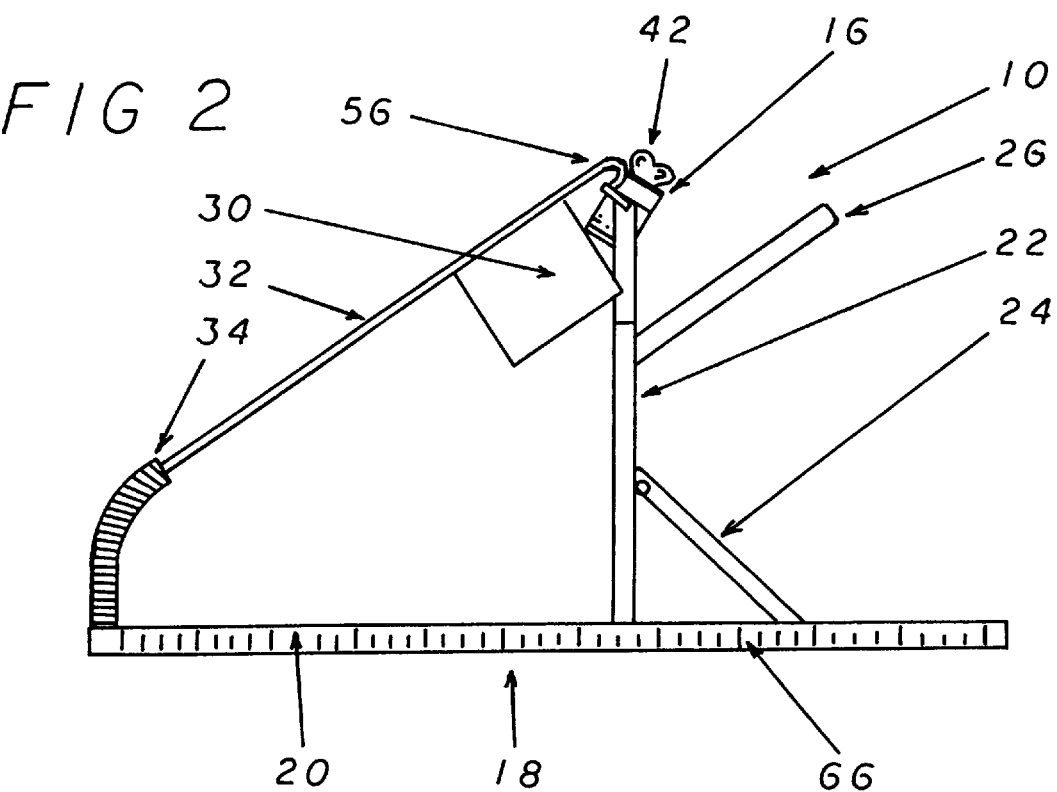
FIG. 2 is a side elevation view of the present invention showing the method of construction, and the manner in which the signal flag is set.

Referring now to the drawings, and more specifically to FIGS. 1, 2 and 3, the fishing rod holder tip-up 10 consists of a pivoting fishing rod clamp 16 and a holder frame 18. The pivoting fishing rod clamp 16 is the portion of the present invention which is used to hold the fishing rod 12 and the fishing reel 14 in place. This is accomplished by passing the fishing rod 12 through the pivoting fishing rod clamp 16 where it is held in place by tightening the fishing rod clamp foot 44, by the use of the fishing rod clamp wing nut 42. The rearward most portion of the fishing rod 12 then extends back where it passes over the fishing rod support 28, and under the crossover portion of the frame U-bracket 26. These features ensure that the fishing rod 12 will be held securely in the desired position while still remaining sensitive enough so that it will not interfere with the natural motion of the fishing rod 12, when a fish takes the offered bait.

The holder frame 18 of the present invention is made up of a frame base 20 that is rectangular in shape, which sits flat upon the surface of the ice (or other surface being fished from), and provides the platform upon which the other components of the present invention are built. Contained upon the outer surface of the frame base 20 is the measurement indicia 66, which provides a quick and easy method for a fisherman to make sure that any fish taken meets the minimum length requirements of the applicable law enforcement body.

Extending upwards from the frame base 20 is the vertical rod clamp support 22, which provides at its upper most end, the point at which the pivoting fishing rod clamp 16 is positioned. The diagonal frame support 24 extends from the frame base 20, and attaches to the vertical rod clamp support 22. This provides the structural rigidity necessary to keep the vertical rod support 22 in position. Additionally, the frame U-bracket 26 extends from the vertical rod clamp support 22 just above, and in an opposite diagonal manner from, the diagonal frame support 24 and, as described above, provides additional bracing for the fishing rod 12 when it is fitted within the pivoting fishing rod clamp 16 of the present invention.

The present invention is also equipped with a signaling apparatus which warns a fisherman when a fish has taken his bait. This apparatus is made up of a signal flag 30, which is attached towards the upper end of the flag rod 32. The flag rod 32 is, in turn, attached at its lower most end to the flag spring 34, which is attached to the most forward left corner of the frame base 20. The flag spring 34 allows the signal flag 30, and the flag rod 32, to be freely flexible but, when unimpeded, to seek a vertical orientation. When the present invention is in use, the flag rod U-tip 56, located at the most upward end of the flag rod 32, is engaged to one of the pivoting clamp support rods 52 of the pivoting fishing rod clamp 16 which serves to "load" the flag spring 34. Therefore, when the flag rod 32 is released from the pivoting clamp support rod 52, the flag spring 34 will seek the vertical position, force the signal flag 30 to pop up, and warn the fisherman of the fish on his line.

The folding or collapsing function of the present invention is illustrated by FIGS. 4 and 5. The frame base 20 is the primary component into which the other components of the present invention are folded. To accomplish this, the pivoting fishing rod clamp 16 must first be removed from the clamp support rod notches 60, located at the most upward end of the vertical rod clamp support 22. The vertical rod clamp support 22 is pivotally attached at its lowermost end to the frame base 20, allowing it to fold within the edges of the frame base 20. This motion is accomplished by removing the upper end of the diagonal frame support 24, from the diagonal bracket attachment notch 48 located on the rearward surface of the vertical rod clamp support 22. The diagonal frame support 24 is, in turn, pivotally attached to the inside surface of the frame base 20 by means of the diagonal bracket wing nut 40, and when the present invention is folded, can be rotated and stored along the inside surface of the frame base 20.

The folding end of the vertical rod clamp support 22 is then accomplished by rotating it forward and down to the point where it lies flush within the frame base 20. The frame U-bracket 26 is also pivotally mounted within the vertical rod clamp support 22 by means of the U-bracket wing nut 38, which, when loosened, allows the frame U-bracket to fold in a forward manner within the vertical rod clamp support 22. Once the present invention is entirely folded, the signal flag 30 and the flag rod 32 can be positioned out of the way by attaching the flag rod U-tip 56 to the flag rod frame attachment bolt 36 located on the inner surface of the frame base 20. By the described means, the present invention is capable of being folded into a flat configuration which facilitates its ease in transport and storage.

The construction and manner of operation of the pivoting fishing rod clamp 16 are detailed by FIGS. 6, 7 and 8. The pivoting fishing rod clamp 16 consists of a fishing rod clamp body 50, which is a short length of circular metal tubing having a portion thereof open, which allows for the easy insertion of the fishing rod handle 13. The fishing rod handle 13 is held in place within the fishing rod clamp body 50, by the fishing rod clamp foot 44. This device is a circular pad which is attached to the fishing rod clamp bolt 46 and the fishing rod clamp wing nut 42. To insert the fishing rod 12, the fisherman rotates the fishing rod clamp wing nut 42 in a counter clockwise manner, in order to back off the fishing rod clamp foot 44, to provide room for the fishing rod handle 13 within the pivoting fishing rod clamp 16.

Once this is accomplished, the fishing rod handle 13 is inserted into the pivoting fishing rod clamp 16, and secured by rotating the fishing rod clamp wing nut in a clockwise fashion until the fishing rod clamp foot securely engages the fishing rod handle 13. It is important to note that the point of attachment of the fishing rod clamp foot 44, to the fishing rod handle 13, should be done at a point on the fishing rod handle 13 so as to ensure the proper operation of the present invention.

The fishing rod clamp body 50 has extending, from opposite sides, the pivoting clamp support rods 52, which engage the clamp support rod notches 60 located on the uppermost end of the vertical rod clamp support 22, and serve to provide the necessary pivoting motion to the pivoting fishing rod clamp 16. Additionally, the left pivoting clamp support rod 52 also has attached to its most outward end the flag attachment extension 54, which extends forward at a ninety degree angle from the left pivoting clamp support rod 52. The flag attachment extension 54 has, at its most forward end, the U-tip notch 58, which is a small depression and provides the attachment point for the flag rod U-tip 56. This serves to hold the signal flag 30 and the flag rod 32 in place. Therefore, when downward pressure is applied by the presence of a fish, causing fishing rod movement 62, the pivoting fishing rod clamp 16 is moved in a counterclockwise fashion. This movement, in turn, lowers the flag attachment extension 54, thereby releasing the flag rod U-tip 56 from the U-tip notch 58, causing signal flag rod movement 64, and alerting the fisherman to the presence of a fish on the end of his line.

Although the present invention has been described in considerable detail, with reference to certain preferred versions thereof, other versions are possible. Therefore, the spirit and scope of the appended claims should not be limited to the description of the preferred versions contained herein.

What is claimed is:

1. A collapsible fishing rod holder tip-up for holding an ice fishing jigging rod and reel combination, said tip-up comprising:

a base section;

a vertical support section having a top and a bottom portion, with said bottom portion pivotally attached to said base section, so as to move pivotally between a first position in parallel with said base and a second position perpendicular with said base;

right and left elongate rod clamp supports having top portions said right and left rod clamp supports extending from said vertical support, said right and left rod clamp supports further defining upper right and left indentations;

a U-shaped bracket pivotally attached to said vertical support; and a clamp body, which defines an open section for receiving said fishing rod, a clamping means and left and right support rods for pivotally and removably connecting with said upper right and left indentations.

2. The collapsible fishing rod holder tip-up as in claim 1 wherein said clamping means is a threaded bolt section having a foot section for contacting said fishing rod.

3. The collapsible fishing rod holder tip-up as in claim 2 further comprising a flexible upwardly biased indicator flag having a lower end and an upper tip, with said lower end fixedly attached to said base section.

4. The collapsible fishing rod holder tip-up as in claim 3, wherein said clamp body further comprises a notch for releasably holding said upper tip.

5. The collapsible fishing rod holder tip-up as in claim 4, wherein said base section further comprises a measuring indicia imprinted on said base section.

6. The collapsible fishing rod holder tip-up as in claim 5, further comprising a diagonal frame support having first and second ends, with said first end pivotally connected to said base section, and said second end releasably engagable with said vertical support section.

7. A collapsible fishing rod holder tip-up for holding an ice fishing rod having a rod portion, and a handle portion, said tip-up comprising:

a base section;

a vertical support section having a top and a bottom portion, with said bottom portion pivotally attached to said base section, so as to move pivotally between a first position in parallel with said base and a second position perpendicular with said base;

right and left elongate rod clamp supports having top portions said right and left rod clamp supports extending from said vertical support, said right and left rod clamp supports further defining upper right and left indentations;

a U-shaped bracket pivotally attached to said vertical support;

a clamp body, which defines an open section for receiving said fishing rod, a clamping means and left and right support rods for pivotally and removably connecting with said upper right and left indentations; and a flexible indicator flag having a bottom portion fixedly attached to said base section, an upper portion having a signaling section and a upper tip portion adapted to removably connect with said clamp body.

8. The collapsible fishing rod holder tip-up as in claim 7, wherein said clamping means is a threaded bolt section having a foot section for contacting said fishing rod.

9. The collapsible fishing rod holder tip-up as in claim 8, wherein said clamp body further comprises a notch for releasably holding said upper tip portion of said flag.

10. The collapsible fishing rod holder tip-up as in claim 9, wherein said base section further comprises a measuring indicia imprinted on said base section.

11. The collapsible fishing rod holder tip-up as in claim 10, further comprising a diagonal frame support having first and second ends, with said first end pivotally connected to said base section, and said second end releasably engagable with said vertical support section.

* * * * *